(12) United States Patent
Storms et al.

(10) Patent No.: US 9,223,928 B1
(45) Date of Patent: Dec. 29, 2015

(54) REVERSE ENGINEERING PART FAMILIES FOR MULTIPLE DISCIPLINES

(71) Applicant: Autodesk, Inc., San Rafael, CA (US)

(72) Inventors: Craig Storms, West Hartford, CT (US); Felix Beer, Baden (AT); Andy Robins, Lancashire (GB)

(73) Assignee: Autodesk, Inc., San Rafael, CA (US)

( * ) Notice: Subject to any disclaimer, the term of this patent is extended or adjusted under 35 U.S.C. 154(b) by 601 days.

(21) Appl. No.: 13/662,310

(22) Filed: Oct. 26, 2012

(51) Int. Cl.
*G06F 17/50* (2006.01)
(52) U.S. Cl.
CPC ................... *G06F 17/5086* (2013.01)
(58) Field of Classification Search
CPC .............. G06F 17/50; G06F 17/5086
See application file for complete search history.

(56) References Cited

U.S. PATENT DOCUMENTS

2002/0130869 A1* 9/2002 Camiener ............... G06F 17/50 345/440
2003/0220911 A1* 11/2003 Tompras .................. G06F 17/50
2007/0089087 A1* 4/2007 Connor ................. G06F 17/509 717/105

OTHER PUBLICATIONS

Jose Fandos, "Creating Pipe Fittings in Revit MEP," Jun. 30, 2012, Revit Technology Conference North America 2012, 24 pages.*
Ellen Finkelstein, "AutoCad 2011 and AutoCad LT 2011," 2010, John Wiley & Sons, pp. 653-882.*
"Enhanced Piping Design," 2007, AutoDesk, Inc., 12 pages.*
"Inside the System," 2011, http://inside-the-system.typepad.com/my_weblog/2011/08/tip-creating-pipeduct-fittings-in-revit-mep.html, downloaded on May 7, 2015, two pages.*
George Omura, "Introducing AutoCad 2010 and AutoCad LT 2010," 2009, Sybex, pp. 162-166.*
Yong Lu et al., "Research of Application Modes of Parts Library System," 2007, Springer-Verlag, pp. 335-346.*
Yingguang Li et al., "Representation and share of part feature information in web-based parts library," 2006, Expert Systems with Applications, vol. 31, pp. 697-704.*

* cited by examiner

*Primary Examiner* — Kamini S Shah
*Assistant Examiner* — Russ Guill
(74) *Attorney, Agent, or Firm* — Fish & Richardson P.C.

(57) ABSTRACT

Methods, systems, and apparatus, including computer programs encoded on a computer storage medium, for identifying a plurality of part families, where each part family comprises a plurality of parts; and for each part in each part family: obtaining connection port geometry information for a physical part in a part family; positioning each of the port vectors in a three-dimensional space at a respective location specified by the port vector; generating a respective port alignment line for each of the port vectors; generating one or more base curves each positioned to align with a plurality of the port alignment lines; generating one or more port solids from the connection port geometry information; and constructing body geometry between each of the one or more port solids by sweeping along a respective base curve, wherein the constructing is based at least on the connection port geometry information.

30 Claims, 7 Drawing Sheets

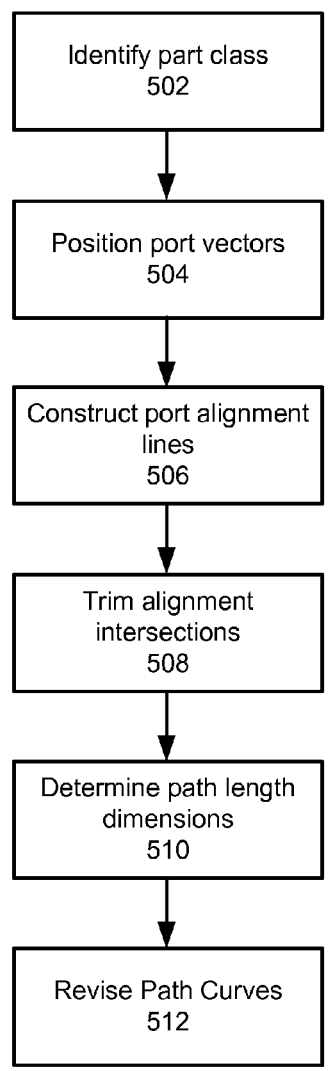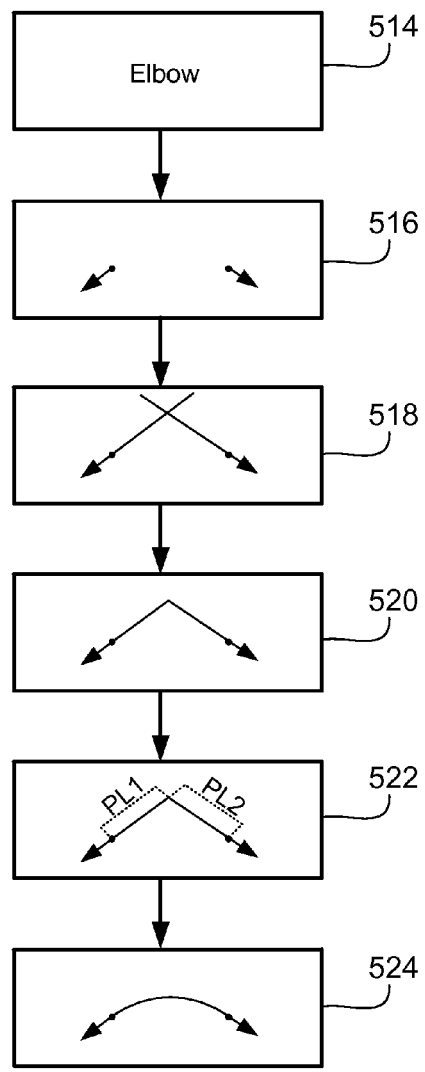
FIG. 5A
FIG. 5B

REVERSE ENGINEERING PART FAMILIES FOR MULTIPLE DISCIPLINES

BACKGROUND

This specification relates to computer aided design and, in particular, part family representation and utilization in computer aided design systems.

Computer-aided design (CAD) systems utilize computers to allow users to create and modify designs of physical parts, mechanical piping, duct, electrical systems, machines, and buildings, for example. Software for CAD systems can represent three-dimensional objects using solid modeling techniques. Solid modeling techniques simulate objects using solid objects and enable a real world CAD model suitable for design and engineering tasks. Solid objects have parameters that behave in ways that are consistent with the physical behavior of corresponding real objects. This allows CAD systems to provide simulation, planning and verification of manufacture and assembly.

SUMMARY

Particular embodiments of the subject matter described in this specification can be implemented to realize one or more of the following advantages. Three-dimensional (3-D) piping applications can require an extensive library of 3-D parts to effectively model real world piping and other mechanical systems. Different CAD systems can utilize different data formats for representing 3-D pipe/mechanical catalogs and pipe specifications. Implementations described herein can enable the export of existing part families from one CAD system to a reverse engineering system that creates part families for different CAD systems. In particular, the system reverse engineers part families of one CAD system to create part families that each run on other different CAD systems. The reverse engineered part families may persist individual parts as fixed solids, or as parametric families which support dynamic resizing. This can eliminate duplication of effort in creating and managing part families. For example, customers can re-use their existing pipe catalogs and specifications on different CAD systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A-B include a flow chart of an example method of generating base curves and an illustration demonstrating the method.

Like reference numbers and designations in the various drawings indicate like elements.

DETAILED DESCRIPTION

Figure 1:
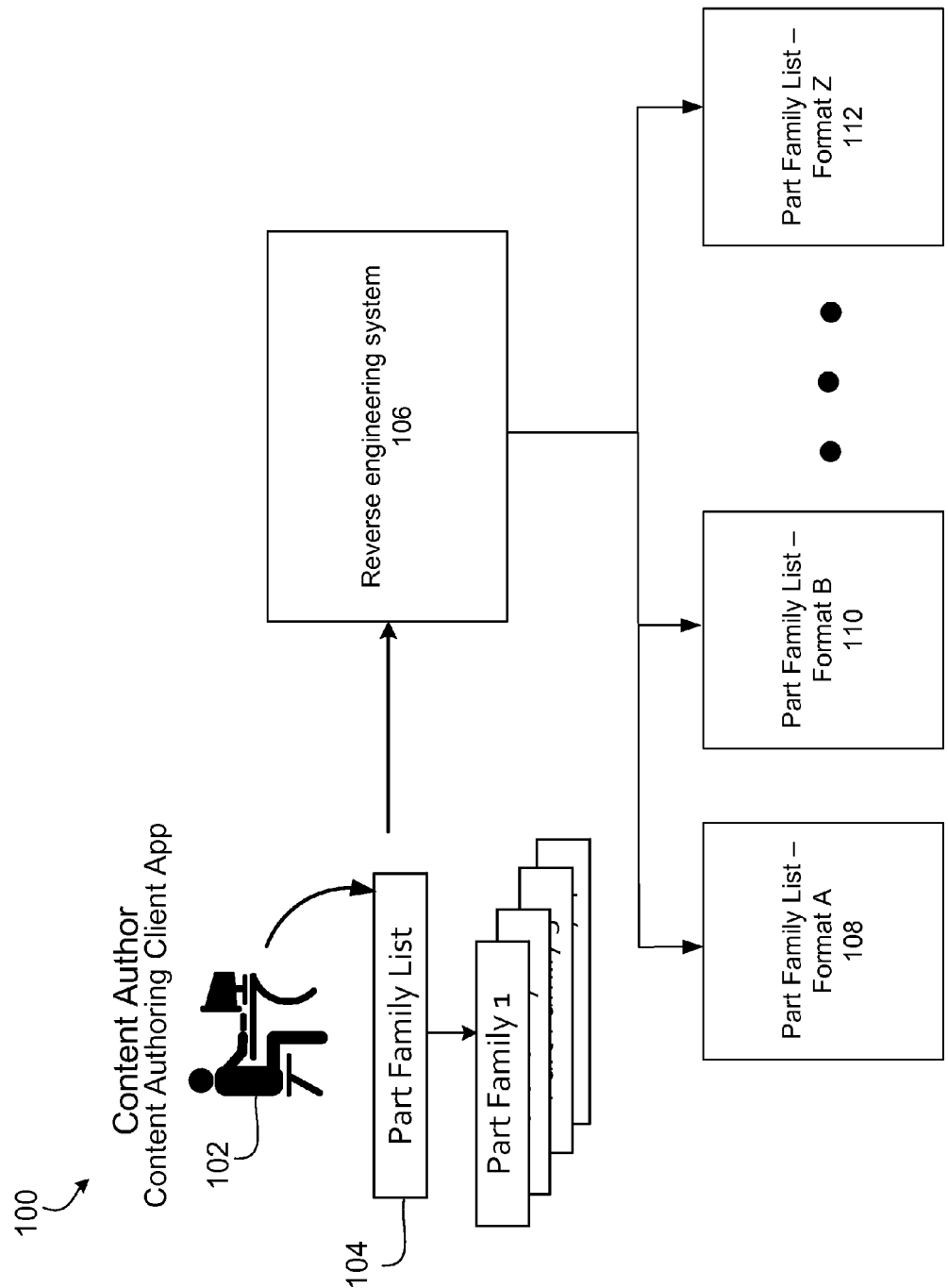
FIG. 1 is an illustration of an example reverse engineering system architecture.

FIG. 1 is an illustration of an example reverse engineering system architecture 100. Users (e.g., content author 102) can create part families compatible with a content authoring client application. The content author 102 can send a list of part families 104 to a reverse engineering system 106. The list of part families 104 include multiple part families, e.g., Part Family 1, Part Family 2, Part Family 3, and Part Family 4. Each part family is compatible with a content authoring client application. A part family comprises a plurality of parts, each part having a same shape and a different respective size, wherein the part family can be represented as a set of parameter values for each part. For example, the part family could utilize a parametric model, as will be described below in reference to FIG. 2. In some implementations, the part family's collection of parts can be represented as an Extensible Markup Language (XML) document or the part family can be represented in another format such as comma-separated values or other table-friendly formats.

The reverse engineering system 106 processes each part family in an initial part family list to generate part family lists in different formats. The reverse engineering system 106 can be implemented on one or more computers located in one or more locations. Each generated part family list is created in a unique format, e.g., Format A 108, Format B 110, or Format Z 112, and is compatible with a respective CAD system, e.g., Application A, Application B, or Application Z, respectively.

In some implementations, after creating part family lists in unique formats, the reverse engineering system 106 manages the formats in a content management system. The content management system allows a user to access a part family list that is compatible with the user's CAD system. For example, a user using Application A can send a request to the content management system. The content management system can detect the type of application the user is using and send a compatible part family list, e.g., the part family list in Format A. Likewise, another user using Application B can receive, from the content management system, the family part list in Format B.

Figure 2:
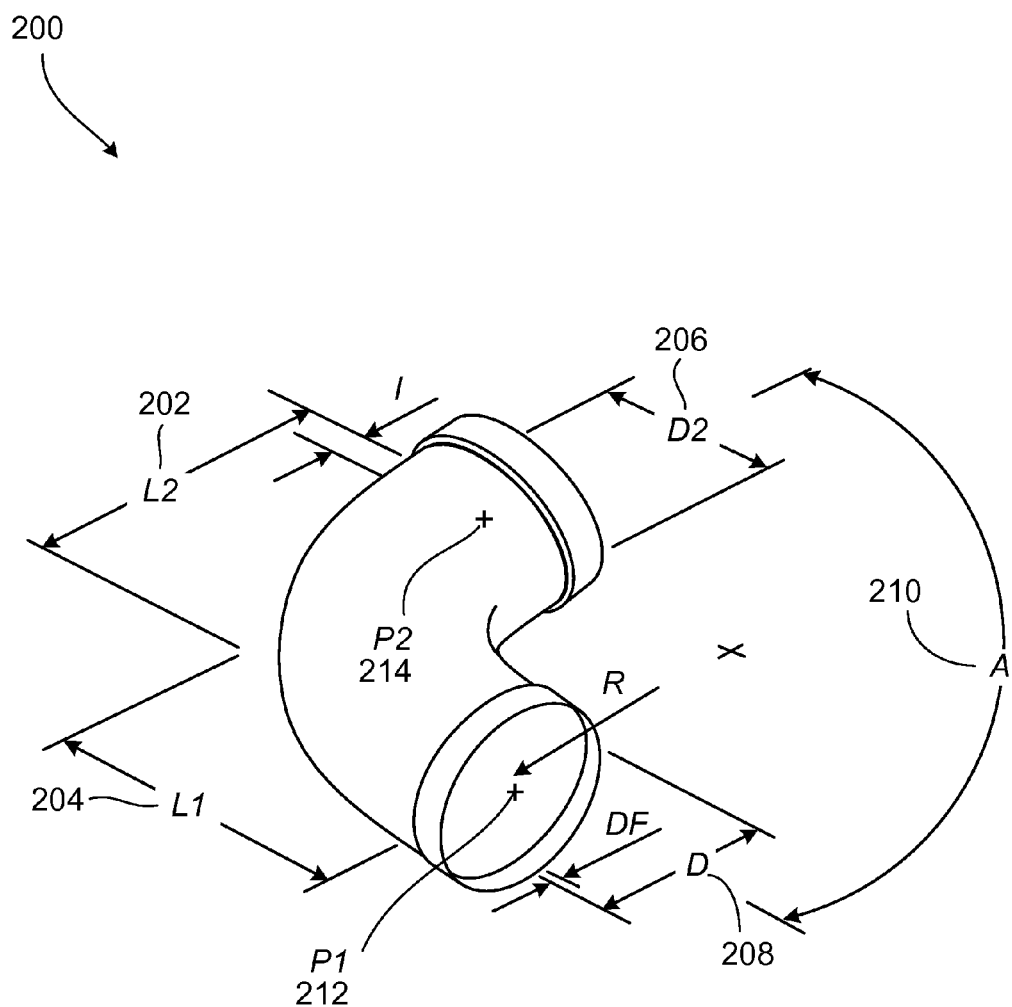
FIG. 2 is an illustration of an example parametric part as presented in a graphical user interface by a CAD system.

FIG. 2 is an illustration of an example elbow joint part 200 as presented in a graphical user interface by a parametric CAD system. Generally speaking, a part is a solid object in a CAD system that is described by graphical and non-graphical parameters. Graphical parameters describe the size and shape of the part (i.e., the part's parametric geometry), and non-graphical parameters describe other features such as the part's material, pressure class, and so on. For example, the parameters L1 (204), L2 (202), D (208), D2 (206), and A (210) are graphical parameters of the elbow joint 200. L1 (204) and L2 (202) are lengths measured from the outer sides of the elbow joint 100. D (208) and D2 (206) are diameters of the elbow joint 200's two openings. The angle A (210) is the angle of the elbow joint 200 which, in this case, is 90 degrees. Other types of graphical parameters are possible.

Non-graphical parameters of a part can describe the material(s) the part is made of, the pressure class (e.g., the pounds of water pressure that the part is designed to handle), the location of connection ports, parameters of connection ports, whether the connection ports are threaded, and so on. Other non-graphical part parameters are possible. A connection port is a location on or within the part where the part can be connected to another part. For example, the elbow joint 200 has two connection ports: connection port P1 (212) and connection port P2 (214) indicating the two locations the elbow joint 200 can be connected to compatible parts. A part can be incorporated into a system, machine or a tool, for example. By way of illustration, the elbow joint 200 can be incorporated into a piping system by connecting its connection ports P1 (212) and P2 (214) to other piping parts such as fittings and pipes. A connection port can have an associated type (e.g., male or female), a size (e.g., diameter), an orientation, and so forth. Other connection port parameters are possible.

Figure 3:
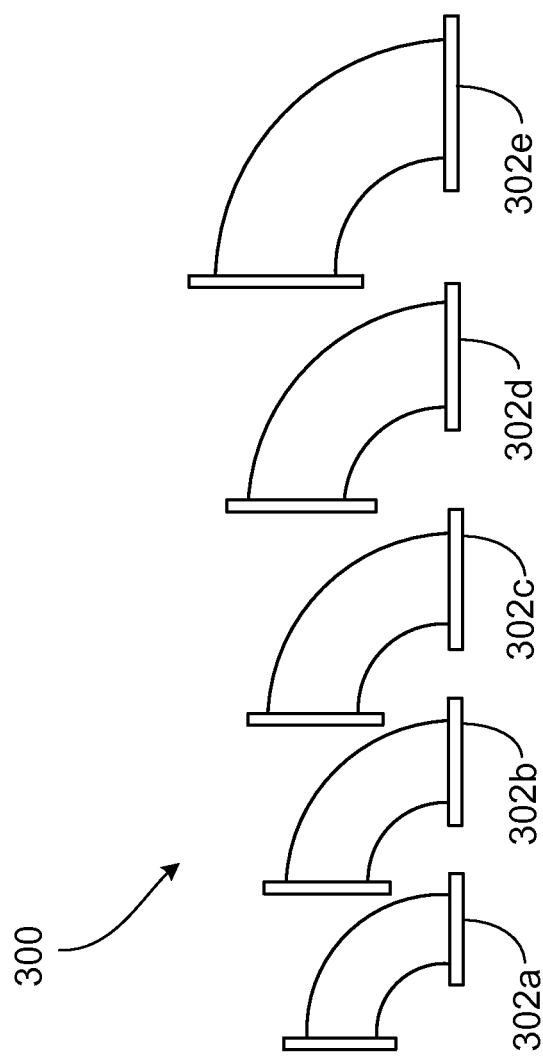
FIG. 3 is an illustration of an example part family.

FIG. 3 is an illustration of an example part family 300 for the elbow joint 200. Parts belong to part families. A part family comprises a set of parts having different sizes but having the same general shape. One or more parameter values can change or remain constant on a per part basis within a part family. The part family 300 is a set of 300 lb. pressure class flanged elbows 302a-e of differing sizes. As can be seen from FIG. 3, the angle A (210) remains the same (i.e., 90 degrees) for each elbow joint in the part family 300, however the other graphical parameters values increase as part sizes progress from small 302a to large 302e. In addition, the connection ports P1 and P2 also change location as the part sizes progress from small 302a to large 302e. In some implementations, a part family is represented as a table of parameter values where each row represents the parameter values for a given part in the family. TABLE 1 is an example of a partial part family table for the elbow joints 302a-e of FIG. 3.

TABLE 1

| PART | L1 | L2 | D | D2 | A | CLASS |
|------|------|------|------|------|-----|-------|
| 302a | 0.34 | 0.66 | 1.24 | 2.23 | 90 | 300 lb |
| 302b | 0.37 | 0.70 | 1.26 | 2.25 | 90 | 300 lb |
| 302c | 0.39 | 0.74 | 1.28 | 2.27 | 90 | 300 lb |
| 302d | 0.41 | 0.78 | 1.30 | 2.29 | 90 | 300 lb |
| 302e | 0.43 | 0.82 | 1.32 | 2.41 | 90 | 300 lb |

One or more of a part's parameters can serve as parameters for a parametric model of the part. That is, some or all of a part's parameters can be used by a parametric model to generate a solid object corresponding to the part. A parametric model uses parameters to control geometric entities, e.g., Boolean primitives, lines, arcs, filleting operations, and so on, that are used to generate the solid object representation of part. The parameters can include the length, width, height, radius or diameter of an entity, for example, as well as specifying locations of the entities within the model of the solid object.

A parametric model of a part can include one or more constraint equations. A constraint equation is a relationship (e.g., a mathematical relationship) between two or more parameters. A given parameter can be required to have the same value of another, for example, or a given parameter's value can be calculated from the values of one or more other parameters. Other constraints are possible. For example, geometric entities can be constrained relative to each other. A geometric entity can be located at a position in the model relative to (e.g., parallel to, perpendicular to, and so on) the location of another entity, for instance. The parametric model generates a solid object representation of the part that preserves the constraint equations and the constraints among geometric entities.

Figure 4:
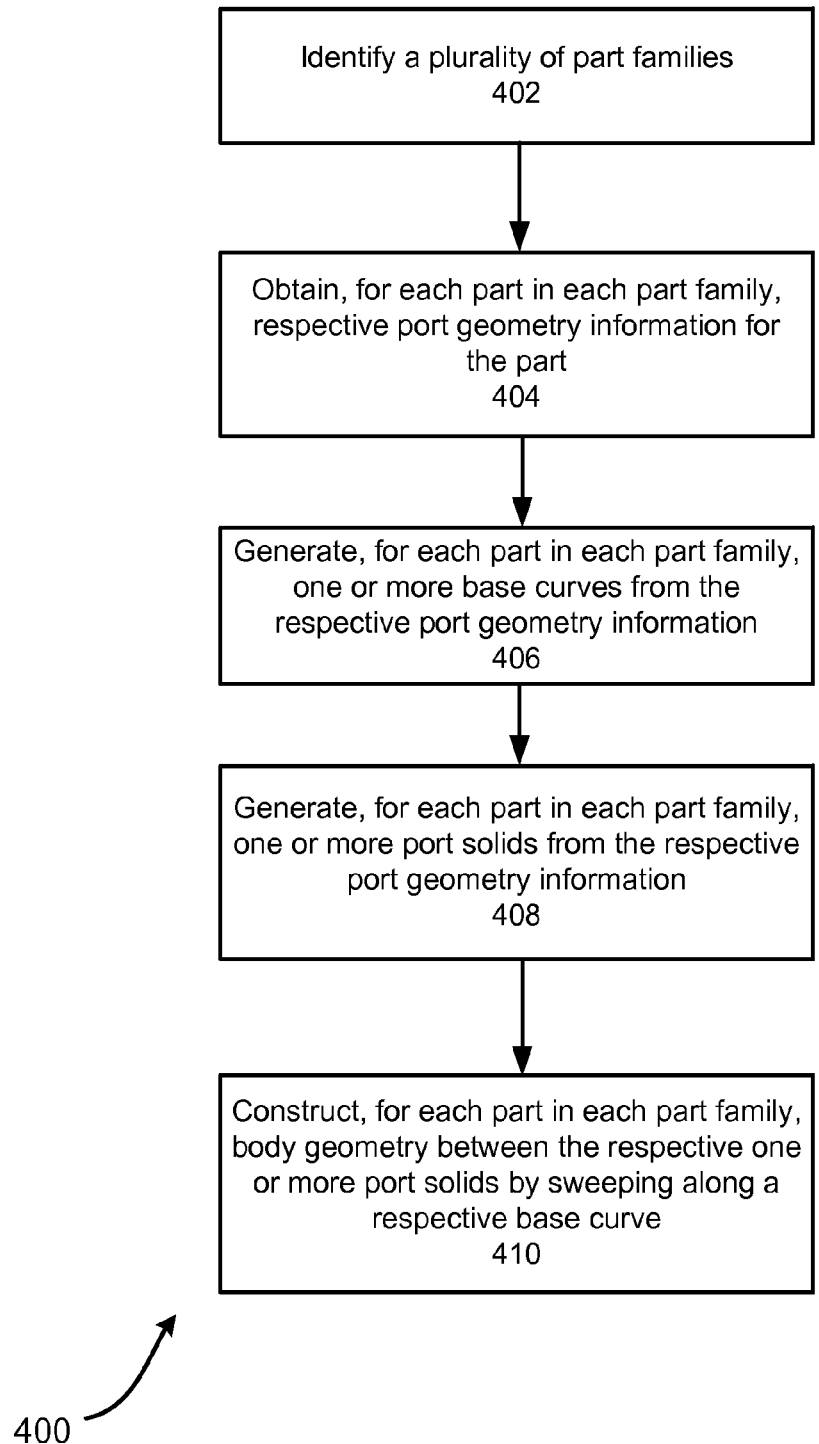
FIG. 4 is a flowchart of an example method of reverse engineering part families.

FIG. 4 is a flowchart of an example method 400 of reverse engineering part families. For convenience, the method 400 will be described with respect to a system, e.g., the reverse engineering system in reference to FIG. 1, having one or more computing devices that performs the method 400.

The system identifies a list of part families 402. The list of part families can be received from a CAD authoring application. In some implementations, the CAD authoring application submits the list of part families to the system. In alternative implementations, the system obtains the list of part families from one or more databases of already generated part families. The part families can comprise piping parts that include one or more of tees, crosses, elbows, wyes, valves, or other pipe fittings.

The system obtains connection port geometry information for each part 404. In some implementations, the port geometry information is stored in a geometry lookup database. The geometry lookup database can be a shared content database that stores graphical and non-graphical data. In particular, the database defines the shape and size of one or more port vectors. Port vectors represent position and direction of ports for the respective part. For example, the elbow joint in reference to FIG. 2 has two port vectors. One port vector represents the position and direction P1 212 should face, and the other port vector represents the position and direction P2 214 should face. In some implementations, the port vectors are defined using coordinates relative to the part's origin.

In some implementations, the connection port geometry information includes an inner diameter, outer diameter, nominal diameter, and a connector length for each port. The port geometry information can also include a number of connection ports for the part. The connection port geometry information can include a deflection angle, a pressure class, material type, or connection end type, e.g., threaded or socket female, mechanical joint female, flanged, beveled, or grooved.

The system generates one or more base curves from the respective port geometry information 406. Base curves are path curves along which a part is constructed. Some parts are formed from more than one general path, and therefore will have more than one base curve, e.g., a branch fitting. Base curves are described below in reference to FIG. 5.

Ports are connected by base curves, which define the path connecting flow between ports. For example, a simple part can be described by a linear path. In some implementations, the path is constructed with other base curves using special revision requirements. For example, an elbow joint can have a special revision requirement to fit an arc around an elbow bend in view of port alignment lines. An example of an application of this special revision requirement will be described below in reference to FIG. 5.

The system generates one or more port solids from the respective port geometry information 408. Port solids are described below in reference to FIG. 6.

The system constructs body geometry between the respective port solids by sweeping along a respective base curve 410. In some implementations, there may be more than one base curve. In this case, the system combines the multiple body geometries that result from the multiple base curves. In some other implementations, the system subtracts one body geometry from another geometry, e.g., the system uses Boolean subtraction to generate a hollow part. The system can determine and save a path length dimension of the body geometry. The path length dimension indicates a measurement of the body of the part. The system can utilize dimensions between ports, lengths of paths, angles between lines, etc. to populate a general set of parametric dimensions to accommodate a common part shape template. The system can also generate a family table with the measured information, e.g., see Tables 2A and 2B below. An example illustration of constructing body geometry 700 is described below in reference to FIG. 7.

In some implementations, the system generates body geometry for a part that has more than two ports. The system can generalize port solid construction for 'n' ports. The 'n' ports can be generated and connected by base curves. In some implementations, the system performs Boolean addition with the port solids and the base curves to generate the body geometry.

FIG. 5A is a flowchart of an example method 500 of generating base curves for a part. FIG. 5B includes visual representations of the example method 500. For convenience, the method 500 will be described with respect to a system, e.g., the reverse engineering system in reference to FIG. 1, having one or more computing devices that performs the method 500.

The system identifies a class for the part 502. The system can access the class from a geometry lookup database. For example, the part can be included in an elbow class 514. In some implementations, a part in a class presumes certain properties of the part. Examples of part classes include elbows, tees, couplings, valves, etc. The part can have certain dimensions or have one or more connection points.

The system positions port vectors 504. Port vectors can be accessed from a geometry lookup database. For example, a part in the elbow class has two port vectors. The system can construct a visual representation 516 of the port vectors. The two port vectors are pointing away from each other. The position and direction of the port vectors serve as a basis for the generation of the one or more base curves.

The system constructs port alignment lines 506. The port alignment lines are aligned along the port vectors. In other words, the port alignment lines extend from the port vectors in a direction towards the inside of the part, e.g., visual representation 518.

The system trims alignment intersections 508. The system identifies excess portions of the port alignment lines and removes them from consideration. For example, visual representation 518 shows port alignment lines that have not yet been trimmed by the system. On the other hand, visual representation 520 shows port alignment lines that have been trimmed by the system.

The system determines path length dimensions 510. A path length dimension can be measured from a port vector position to an intersection of a port alignment line. For example, visual representation 522 shows one path length dimension, PL1, to be from a port vector position to an intersection of a port alignment line. Likewise, another path length dimension, PL2, is measured from the other port vector position to the intersection. The system can save the path length dimensions, e.g., in a database, for generating the solid part.

The system revises the generated base curves 512. The base curves are based on a class, and each class can be associated with special revisions. Special revisions limit the base curves to be formed in a particular way. For example, an elbow joint 502 may have a special revision to fit an arc to an elbow bend shape in view of port alignment lines. Originally, as shown in visual representation 522, the port alignment lines are straight. After the system determines there is a special revision associated with the base curve based on the class, the system revises the base curve to satisfy the special revision, e.g., as shown in visual representation 524.

Figure 6A:
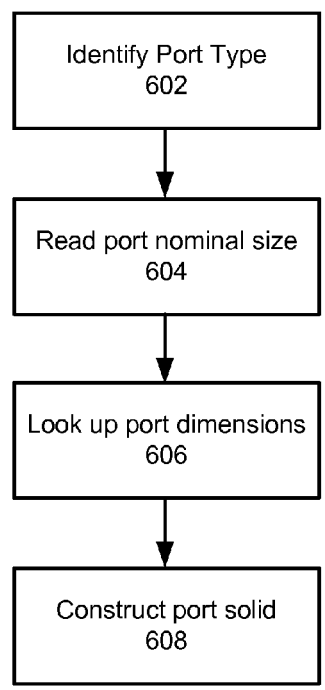
FIGS. 6A-B include a flowchart of an example method of generating port solids and an illustration of a generated port solid.
Figure 6B:
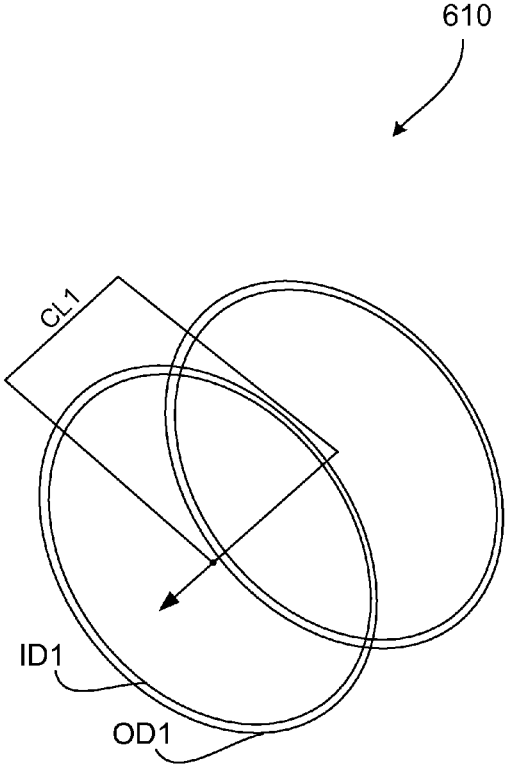

FIG. 6A is a flowchart of an example method 600 of generating port solids. FIG. 6B is an illustration of a generated port solid. For convenience, the method 600 will be described with respect to a system, e.g., the reverse engineering system in reference to FIG. 1, having one or more computing devices that performs the method 600.

The system can position one or more port solids on one or more base curves. The system identifies a port type 602, e.g., a threaded female. For example, the system can obtain this from a geometry lookup database. The system can also read the port's nominal size and dimensions from the geometry lookup database 604, 60. The nominal sizes and port dimensions can include an inner diameter ID1, outer diameter OD1, and connector length CL1. The inner diameter IL1 can be a diameter that measures an inner circle of one side of the port opening. The outer diameter OL1 can be a diameter that measures an outer circle of one side of the port opening. The connector length CL1 can be a length measuring between two sides of the port opening. The system constructs a port solid 608 based on the accessed values, e.g., see visual representation 610.

Figure 7:
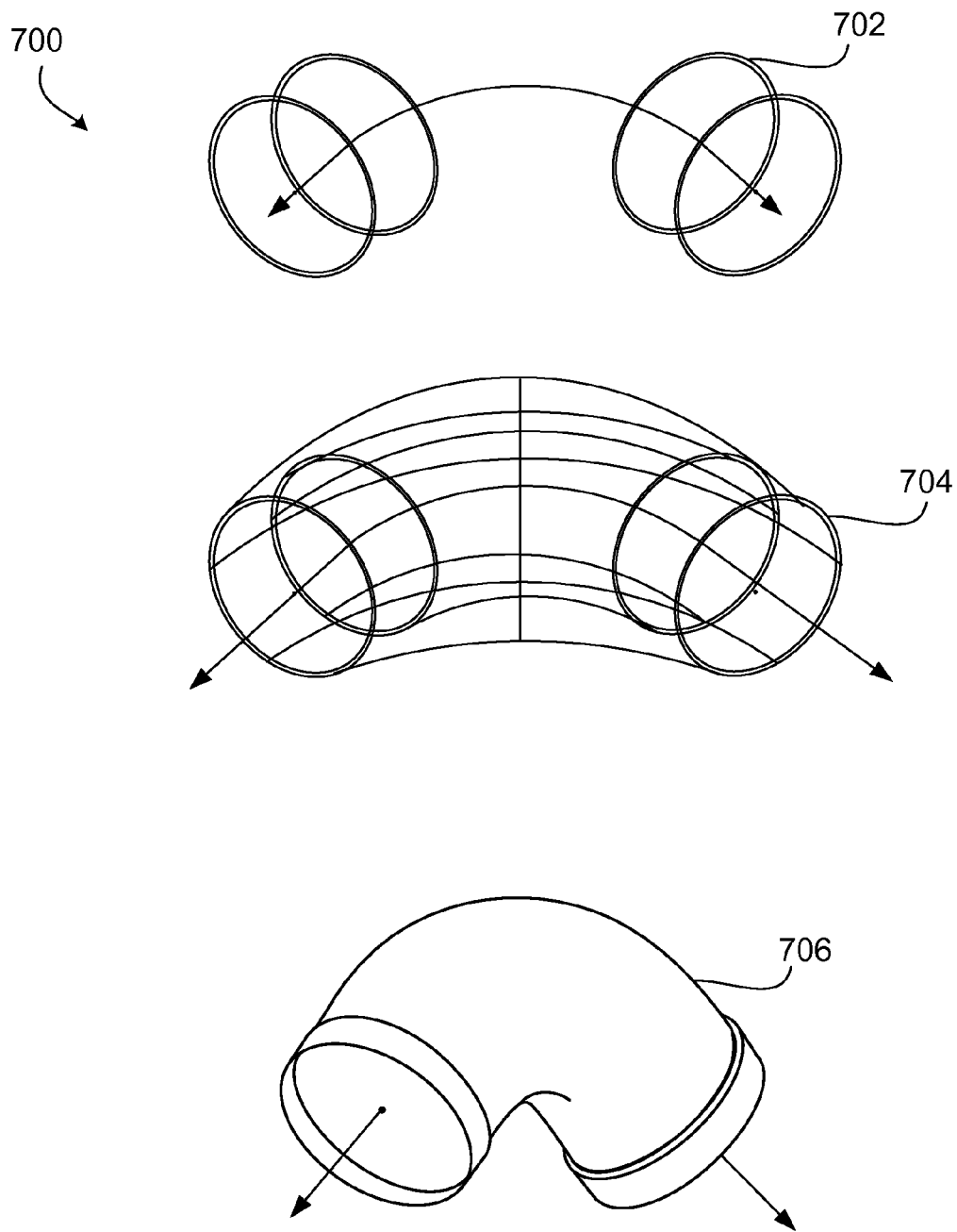
FIG. 7 is an example illustration of constructing body geometry of an elbow joint.

FIG. 7 is an example illustration of constructing body geometry of an elbow joint. Visual representation 702 shows both port solids positioned along the base curve of the elbow joint. The port solids can be constructed using nominal size, connector length, connection port end type, material, and pressure class to define both inner and outer port diameters and placement relative to the connection vectors. For example, the illustrated part has an "elbow" type and the path angle is known to be 90 degrees. The connection port vectors define the plane of the arc needed to define the curved path of flow through the part, e.g., a fluid flow. The 90 degree arc can be placed along the line segments inside the ports which match connector lengths.

Visual representation 704 shows a body geometry being created by sweeping the port solids along the base curve. The matching pipe outer and inner diameters can be obtained from a geometry lookup table, e.g., the lookup table in reference to FIG. 2. Solid geometry can be constructed by sweeping the matching pipe inner and outer diameters along the arc and extruding cylinders to model the ports.

Visual representation 706 shows a model reverse-engineered part. Using Boolean addition, e.g., to combine the separate geometries, and subtraction, e.g., to create a hollow part, the reverse-engineered part is generated to exactly fit the connection sizes and positions.

As an example, after constructing the part, the reverse-engineering system can represent reverse-engineered parts A-E in the following tables:

TABLE 2A

| Part | Path Angle | Pressure Class | Connection End Type | Nom Dia | ID1 | OD1 | CL1 |
| --- | --- | --- | --- | --- | --- | --- | --- |
| A | 90 | 300 | Threaded Female | 1 | 1.32 | 1.43 | 0.75 |
| B | 90 | 300 | Threaded Female | 1.5 | 1.90 | 2.07 | 0.87 |
| C | 90 | 300 | Threaded Female | 2 | 2.38 | 2.59 | 1.00 |
| D | 90 | 300 | Threaded Female | 4 | 2.88 | 3.14 | 1.17 |
| E | 90 | 300 | Threaded Female | 6 | 3.50 | 3.82 | 1.23 |

TABLE 2B

| Part | PD1 | PL1 | ID2 | OD2 | CL2 | PL2 | PD2 |
| --- | --- | --- | --- | --- | --- | --- | --- |
| A | 1.32 | 0.88 | 1.32 | 1.43 | 0.75 | 0.88 | 1.32 |
| B | 1.90 | 1.26 | 1.90 | 2.07 | 0.87 | 1.26 | 1.90 |
| C | 2.38 | 1.50 | 2.38 | 2.59 | 1.00 | 1.50 | 2.38 |
| D | 2.88 | 1.77 | 2.88 | 3.14 | 1.17 | 1.77 | 2.88 |
| E | 3.50 | 2.15 | 3.50 | 3.82 | 1.23 | 2.15 | 3.50 |

The structure of tables 2A and 2B represent examples of partial template parameters for reverse-engineered parts that are compatible with multiple applications. Various applications can access values from these tables and generate one or more part solids using these dimensions. The entries in Tables 2A and 2B represent parts of a part family. In particular, the entries represent elbow joints of different sizes. For example, an entry includes a nominal diameter ("Nom Dia"), an inner diameter for a first connection end and a second connection end ("ID1" and "ID2" respectively), an outer diameter for the first connection end and the second connection end ("OD1" and "OD2"), a connector length for the first connection end and the second connection end ("CL1" and "CL2" respectively), a path sweep diameter to connect the first connection end and the second connection end ("PD1" and "PD2" respectively), a path length from the first connection end to path intersection ("PL1"), and a path length from the second connection end to path intersection ("PL2").

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. By way of further illustration, a data processing apparatus can be a touch screen enabled device such as a smart phone or a tablet computer. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   identifying a plurality of part families, where each part family comprises a plurality of parts and each part in a respective family being represented as a set of parameter values wherein each part family in the plurality of part families being compatible with a content authoring client application;
   receiving a selection of a first part family from the plurality of part families, the first part family including plural parts and being represented as a set of parameter values;
   creating one or more parts family lists for the selected first part family including processing the parts in the selected first part family, wherein processing the parts includes
   for each part in the selected first part family:
      obtaining connection port geometry information for a physical part in the selected first part family wherein the connection port geometry information includes a plurality of port vectors each representing a distinct respective physical port of the part;
      positioning each of the port vectors in a three-dimensional space at a respective location specified by the port vector;
      generating a respective port alignment line for each of the port vectors, wherein the port alignment line specifies an alignment of the respective port of the port vector in relation to the part;
      generating one or more base curves each positioned to align with a plurality of the port alignment lines, wherein the position of the base curve is based on, at least, the connection port geometry information, and wherein the base curve indicates a position and a direction of at least a portion of the part;
      generating one or more port solids from the connection port geometry information, wherein each of the one or more port solids are positioned to align with a respective base curve so that the one or more port solids can be connected to each other;
      constructing body geometry between each of the one or more port solids by sweeping along a respective base curve, wherein the constructing is based at least on the connection port geometry information;
      storing a representation of the selected first part family based on the constructing; and
      creating a plurality of representations of the selected first part family based on the representation, one for each of a plurality of different CAD systems;
   receiving a request for a part in the selected first part family;
   determining a CAD system type associated with the request;
   locating a representation of the selected first part family in accordance with the type from the created plurality of representations of the selected first part family; and
   providing the located representation responsive to the received request.

2. The method of claim 1, wherein the connection port geometry information includes one or more of the following: an angle, a pressure class, a material type, a connection end type, a nominal diameter, a connector length, an inner diameter, an outer diameter, a number of connection ports, or a special revision requirement.

3. The method of claim 2, wherein the connection end type is one of the following: socket, flange, mechanical joint, or beveled.

4. The method of claim 2, wherein the special revision requirement is an instruction to fit an arc around an elbow bend in view of two of the port alignment lines.

5. The method of claim 1, further comprising:
saving, for each port alignment line, a path length dimension;
using the path length dimensions in the constructing of the body geometry.

6. The method of claim 1, wherein constructing the body geometry further comprises:
combining one or more first body geometries along the respective base curve;
subtracting one or more second body geometries from the combined body geometries to create the body geometry, wherein the body geometry is hollow.

7. The method of claim 1, wherein the part family comprises piping parts that include one or more of tees, crosses, elbows, wyes, or couplings.

8. The method of claim 1, further comprising:
generating a family table, wherein each entry in the table includes size parameters of a respective part in the part family, and wherein the size parameters are based on dimensions of the respective body geometry, the one or more respective port solids, and the one or more respective base curves.

9. The method of claim 1, wherein the connection port geometry information is obtained from a geometry lookup database.

10. The method of claim 1, further comprising:
after generating the respective port alignment lines, trimming one or more excess alignment paths from one or more of the port alignment lines, wherein each excess alignment path extends from an intersection between a plurality of the port alignment lines.

11. A system comprising:
a processor; and
computer-readable medium coupled to the processor and having instructions stored thereon, which, when executed by the processor, cause the processor to perform operations comprising:
identifying a plurality of part families, where each part family comprises a plurality of parts and each part in a respective family being represented as a set of parameter values wherein each part family in the plurality of part families being compatible with a content authoring client application;
receiving a selection of a first part family from the plurality of part families, the first part family including plural parts and being represented as a set of parameter values;
creating one or more parts family lists for the selected first part family including processing the parts in the selected first part family, wherein processing the parts includes;
for each part in the selected first part family:
obtaining connection port geometry information for a physical part in the selected first part family wherein the connection port geometry information includes a plurality of port vectors each representing a distinct respective physical port of the part;
positioning each of the port vectors in a three-dimensional space at a respective location specified by the port vector;
generating a respective port alignment line for each of the port vectors, wherein the port alignment line specifies an alignment of the respective port of the port vector in relation to the part;
generating one or more base curves each positioned to align with a plurality of the port alignment lines, wherein the position of the base curve is based on, at least, the connection port geometry information, and wherein the base curve indicates a position and a direction of at least a portion of the part;
generating one or more port solids from the connection port geometry information, wherein each of the one or more port solids are positioned to align with a respective base curve so that the one or more port solids can be connected to each other;
constructing body geometry between each of the one or more port solids by sweeping along a respective base curve, wherein the constructing is based at least on the connection port geometry information;
storing a representation of the selected first part family based on the constructing; and
creating a plurality of representations of the selected first part family based on the representation, one for each of a plurality of different CAD systems;
receiving a request for a part in the selected first part family;
determining a CAD system type associated with the request;
locating a representation of the selected first part family in accordance with the type from the created plurality of representations of the selected first part family; and
providing the located representation responsive to the received request.

12. The system of claim 11, wherein the connection port geometry information includes one or more of the following: an angle, a pressure class, a material type, a connection end type, a nominal diameter, a connector length, an inner diameter, an outer diameter, a number of connection ports, or a special revision requirement.

13. The system of claim 12, wherein the connection end type is one of the following: socket, flange, mechanical joint, or beveled.

14. The system of claim 12, wherein the special revision requirement is an instruction to fit an arc around an elbow bend in view of two of the port alignment lines.

15. The system of claim 11, further comprising:
saving, for each port alignment line, a path length dimension;
using the path length dimensions in the constructing of the body geometry.

16. The system of claim 11, wherein constructing the body geometry further comprises:
combining one or more first body geometries along the respective base curve;
subtracting one or more second body geometries from the combined body geometries to create the body geometry, wherein the body geometry is hollow.

17. The system of claim 11, wherein the part family comprises piping parts that include one or more of tees, crosses, elbows, wyes, or couplings.

18. The system of claim 11, further comprising:
generating a family table, wherein each entry in the table includes size parameters of a respective part in the part family, and wherein the size parameters are based on dimensions of the respective body geometry, the one or more respective port solids, and the one or more respective base curves.

19. The system of claim 11, wherein the connection port geometry information is obtained from a geometry lookup database.

20. The system of claim 11, further comprising:
after generating the respective port alignment lines, trimming one or more excess alignment paths from one or more of the port alignment lines, wherein each excess alignment path extends from an intersection between a plurality of the port alignment lines.

21. A non-transitory computer-readable medium having instructions stored thereon, which, when executed by a processor, cause the processor to perform operations comprising:
identifying a plurality of part families, where each part family comprises a plurality of parts and each part in a respective family being represented as a set of parameter values wherein each part family in the plurality of part families being compatible with a content authoring client application;
receiving a selection of a first part family from the plurality of part families, the first part family including plural parts and being represented as a set of parameter values;
creating one or more parts family lists for the selected first part family including processing the parts in the selected first part family, wherein processing the parts includes;
for each part in the selected first part family:
obtaining connection port geometry information for a physical part in the selected first part family wherein the connection port geometry information includes a plurality of port vectors each representing a distinct respective physical port of the part;
positioning each of the port vectors in a three-dimensional space at a respective location specified by the port vector;
generating a respective port alignment line for each of the port vectors, wherein the port alignment line specifies an alignment of the respective port of the port vector in relation to the part;
generating one or more base curves each positioned to align with a plurality of the port alignment lines, wherein the position of the base curve is based on, at least, the connection port geometry information, and wherein the base curve indicates a position and a direction of at least a portion of the part;
generating one or more port solids from the connection port geometry information, wherein each of the one or more port solids are positioned to align with a respective base curve so that the one or more port solids can be connected to each other;
constructing body geometry between each of the one or more port solids by sweeping along a respective base curve, wherein the constructing is based at least on the connection port geometry information;
storing a representation of the selected first part family based on the constructing; and
creating a plurality of representations of the selected first part family based on the representation, one for each of a plurality of different CAD systems;
receiving a request for a part in the selected first part family;
determining a CAD system type associated with the request;
locating a representation of the selected first part family in accordance with the type from the created plurality of representations of the selected first part family; and
providing the located representation responsive to the received request.

22. The computer-readable medium of claim 21, wherein the connection port geometry information includes one or more of the following: an angle, a pressure class, a material type, a connection end type, a nominal diameter, a connector length, an inner diameter, an outer diameter, a number of connection ports, or a special revision requirement.

23. The computer-readable medium of claim 22, wherein the connection end type is one of the following: socket, flange, mechanical joint, or beveled.

24. The computer-readable medium of claim 22, wherein the special revision requirement is an instruction to fit an arc around an elbow bend in view of two of the port alignment lines.

25. The computer-readable medium of claim 21, further comprising:
saving, for each port alignment line, a path length dimension;
using the path length dimensions in the constructing of the body geometry.

26. The computer-readable medium of claim 21, wherein constructing the body geometry further comprises:
combining one or more first body geometries along the respective base curve;
subtracting one or more second body geometries from the combined body geometries to create the body geometry, wherein the body geometry is hollow.

27. The computer-readable medium of claim 21, wherein the part family comprises piping parts that include one or more of tees, crosses, elbows, wyes, or couplings.

28. The computer-readable medium of claim 21, further comprising:
generating a family table, wherein each entry in the table includes size parameters of a respective part in the part family, and wherein the size parameters are based on dimensions of the respective body geometry, the one or more respective port solids, and the one or more respective base curves.

29. The computer-readable medium of claim 21, wherein the connection port geometry information is obtained from a geometry lookup database.

30. The computer-readable medium of claim 21, further comprising:
after generating the respective port alignment lines, trimming one or more excess alignment paths from one or more of the port alignment lines, wherein each excess alignment path extends from an intersection between a plurality of the port alignment lines.

* * * * *